Aug. 31, 1965  R. M. DURIS ETAL  3,204,236
PERSONNEL LOCATING DEVICE

Filed April 20, 1962  8 Sheets-Sheet 1

INVENTORS
RUDOLPH M. DURIS &
VLADIMIR IGNATJEV

BY

ATTORNEYS

INVENTORS
RUDOLPH M. DURIS &
VLADIMIR IGNATJEV

BY

*Eyre, Mann & Lucas*

ATTORNEYS

INVENTORS
RUDOLPH M. DURIS &
VLADIMIR IGNATJEV
BY
ATTORNEYS

United States Patent Office 3,204,236
Patented Aug. 31, 1965

3,204,236
PERSONNEL LOCATING DEVICE
Rudolph M. Duris, South Norwalk, and Vladimir Ignatjev, Norwalk, Conn., assignors to Edwards Company Inc., a corporation of New York
Filed Apr. 20, 1962, Ser. No. 189,131
5 Claims. (Cl. 340—357)

This invention relates to a device which generates signals either visual or audible for locating a designated individual in an industrial plant, hospital or other institution.

In accordance with the present invention a support member preferably in the form of a thin disc with printed circuit arranged in a certain prescribed manner on at least one surface thereof is caused to move relative to a sliding contact whereby an electric circuit is intermittently opened and closed to generate a selected signal sequence. The disc with printed circuit advantageously provides an exceedingly compact unit capable of generating a large number of signal sequences.

Signalling may be interrupted at any time and if this occurs in the middle of a signal sequence automatic controls cause the disc to continue to rotate without generating signals until an index line on the disc reaches a predetermined position which marks the start of all of the different signal sequences. As a result when the wheel is stopped it is ready to start up at the beginning of a selected signal sequence and there is no danger of scrambling.

In one embodiment of the invention automatic controls may be set to repeat a given signal sequence any desired number of times and when this is done signaling will automatically stop at the proper time to avoid scrambling. In one embodiment of the invention a novel hot wire relay is employed to start the signaling cycle and thereafter transfer control of the cycle to a special timing device which automatically stops the signal sequence at the designated time.

These and other advantages of the device may be readily understood by reference to the accompanying drawings in which—

Figure 1:
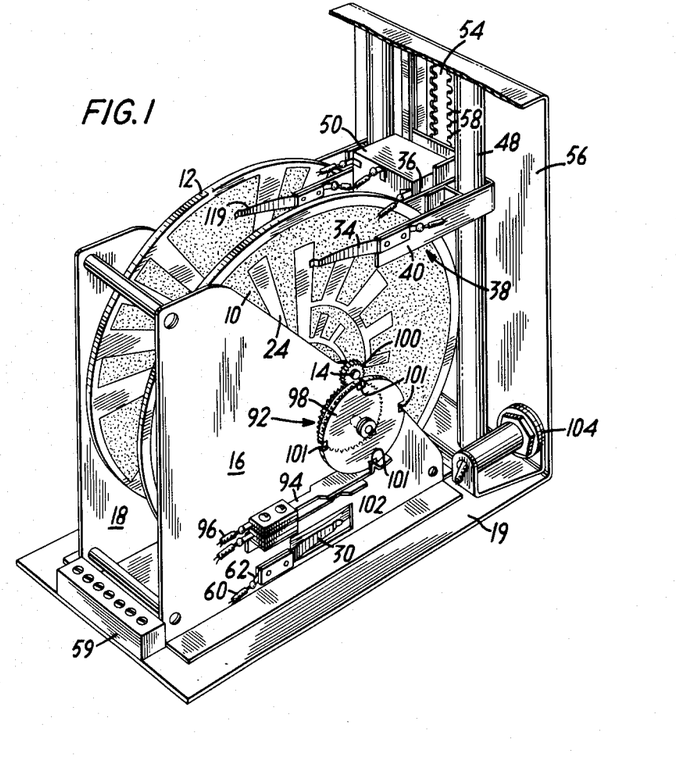
FIG. 1 is a rear perspective view of one form of device.
Figure 7:
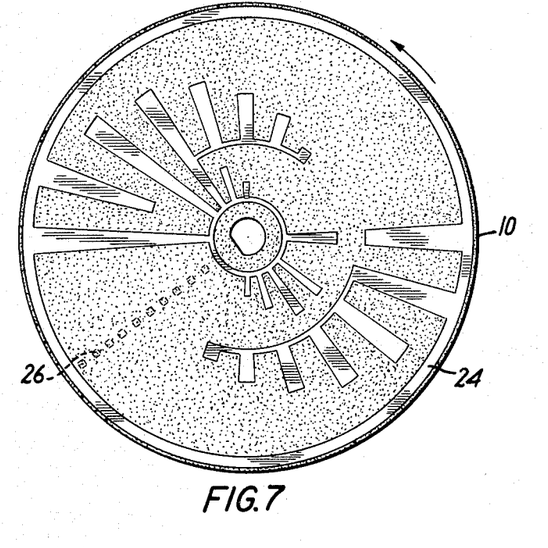
FIGS. 7 and 8 illustrate the way in which printed circuits may be arranged on the disc of the device of FIG. 1.
Figure 8:
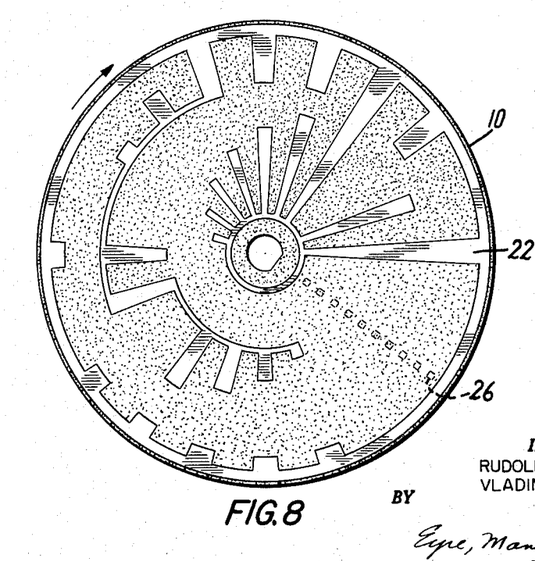

In FIG. 1 a pair of code signal wheels 10 and 12 respectively in the form of thin discs of electric insulating material are mounted in fixed position on a shaft 14 which is in turn rotatively mounted in suitable support members 16 and 18 carried by framework 19. A conventional electric motor 20 (FIG. 3) is provided to drive the shaft and rotate the code wheels. As best shown in FIGS. 7 and 8 code wheel 10 is provided with a printed circuit 22 on the surface of one side thereof and preferably with a second printed circuit 24 on the surface of the second side of the wheel. In the form of structure shown in FIG. 1 the signal code wheel is made of a glass epoxy plastic and the printed circuit is an electric conductive metal applied in conventional manner. The metallic elements of the printed circuit are all interconnected in a single circuit and the starting point for each one of the different code sequences is marked by a box 26. There are ten boxes arranged along the line of a radius of the wheel to form an index line marking the start of each of the different code sequences of printed circuit 22 and ten boxes 26 mark the start of each of the different code sequences of printed circuit 24. The boxes of printed circuit 22 and 24 respectively are preferably arranged in corresponding position on opposite sides of the code wheel so that each of the ten boxes on one side of the wheel will be exactly aligned with a corresponding box on the opposite side of the wheel. These boxes perform no function in the operation of the device. However, the line they form provides a convenient reference for aligning the device when it is assembled. In the form of structure shown code wheel 10 has twenty different code sequences and code wheel 12 is also provided with twenty different code sequences arranged on the wheel in similar manner. The different code sequences may be determined by following the circumference of a circle which passes through one of the boxes 26.

The code of the box adjacent the periphery of the wheel of printed circuit 22 is two while the code of the box adjacent the center of the wheel is one-four. With the illustrated wheel each of these codes will sound twice for each revolution of the code wheel. However, the number of signals for each revolution is not fixed and may be easily changed by changing the printed circuit. Each of the radial elements of the printed circuit are tapered so that the width adjacent the periphery of the wheel is greater than the width adjacent the center. As a result a sliding contact (later described) will make contact with any one element for approximately the same period of time adjacent the center of the wheel and adjacent the periphery when the wheel rotates at constant speed. It will be understood that boxes 26 are used merely for the purpose of illustration and these are not necessary in a commercial structure. The wheel need not be round as illustrated in the drawings.

Electric current is fed to printed circuits 22 and 24 by means of the spring contacts 28 and 30 respectively which bear with positive pressure against (FIG. 5) the continuous line of the printed circuit adjacent the periphery on opposite sides of the wheel. A second pair of spring contacts 32 and 34 each of which bear with positive pressure against opposite sides of the wheel complete the electric circuit through printed circuits 22 and 24 respectively.

Spring contact 32 is mounted on one leg 36 of a generally U-shaped yoke 38 (FIG. 2) and spring contact 34 is mounted on the second leg 40 of the yoke. Yoke 38 carries a cylindrical slide 42 which is slidably mounted between two springs 44 and 46 within a tube 48. A double throw double pole switch 50 is also mounted on yoke 38 with the operating pole 52 of the switch positioned in a slot 54 arranged lengthwise in the front plate 56 of frame-work 19. The springs 44 and 46 are balanced so that switch 50 will be automatically positioned at about the mid-point of the length of the slot when pole 52 is in the off position and free to move up or down in the slot. Both springs maintain contact with slide 42 regardless of the position of pole 52 along the length of the slot and the opposed force of compression and expansion of the springs provides smooth but controlled movement of switch 50.

Slot 54 is notched along each of its sides as at 58 and a notch is provided for each one of the different code sequences of the printed circuits of code wheel 10. For example the top notch at the right hand side of slot 54 (FIG. 3) corresponds to the box 26 located adjacent the periphery of the code wheel for printed circuit 22 and the bottom notch on the right hand side of the slot corresponds to box 26 located adjacent the center of the code wheel for printed circuit 22. The notches on the left hand side of slot 54 are arranged in similar manner for printed circuit 24. The longitudinal distance between notches along any one side of slot 54 equals the distance between the boxes 26 along the index line on the corresponding side of the code wheel. Each notch is provided with the name of an individual who has been assigned the code of the notch.

In operation switch 50 is moved up or down and pole 52 is then moved either right or left into the notch of the designated individual. At this time spring contacts 32 and 34 are positioned at the starting point of the selected code. For example, if the pole 52 is moved into the right hand notch (FIG. 3) it closes the circuit through contact 32 and if pole 52 is moved into the left hand notch it closes the circuit through contact 34.

Figure 5:
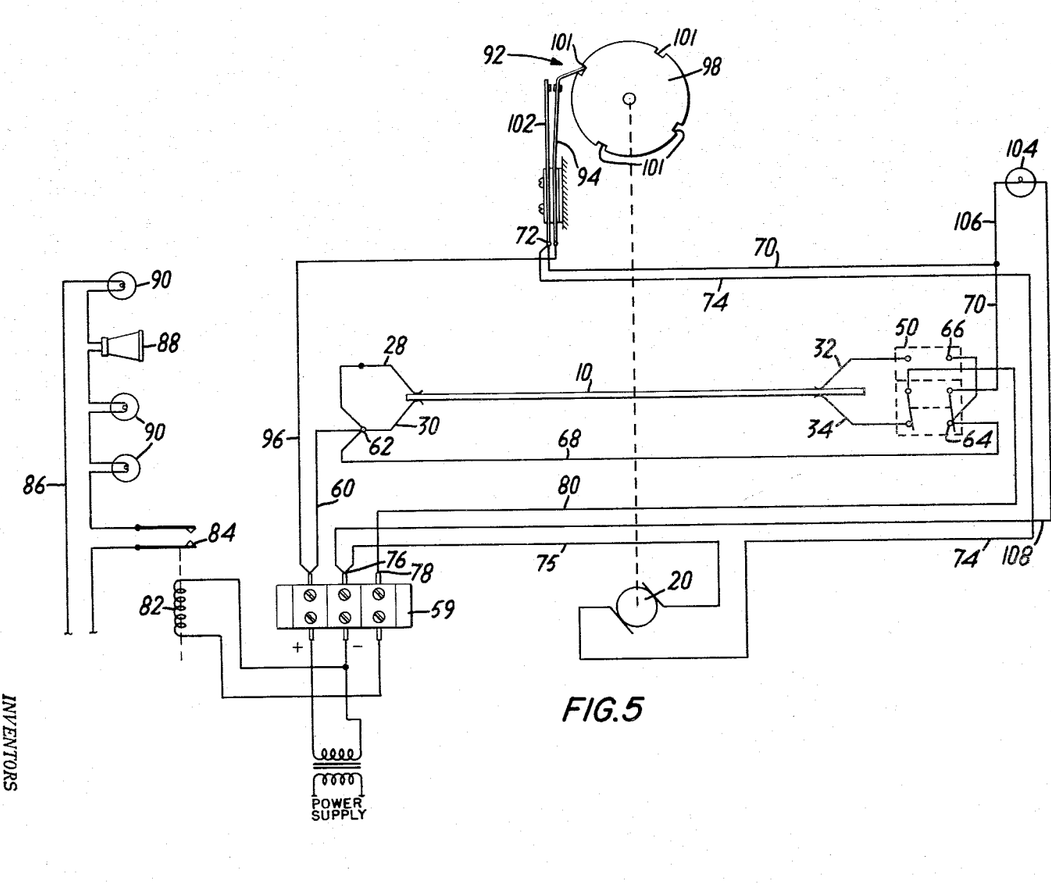
FIGS. 5 and 6 are schematic diagrams of electric circuits for operating the signal generating device of the present invention.

One electric circuit for controlling operation is shown in FIG. 5. Assuming that pole 52 of switch 50 is moved into a notch on the right hand side of slot 54, electric current will be fed from terminal block 59 through line 60 to terminal 62 of spring contact 30 which in turn feeds current into printed circuit 24. In order to start motor 20 to rotate the code wheels current is fed to both terminals 64 and 66 of switch 50 by wire 68. Since pole 52 of switch 50 is closed against terminal 64 the current passes through wire 70 to terminal 72 and then through wire 74 to motor 20 and out conduit 75 to terminal 76 to complete the circuit through the motor. The motor will cause the code wheels 10 and 12 to rotate and when spring contact 34 slides across the metallic portion of the printed circuit, electric current will be fed through the double pole double throw switch 50 to terminal 78 by means of wire 80.

Terminal 78 of the terminal block 59 feeds the current to a conventional relay 82 which in turn closes the contact switch 84 in a separate electric circuit 86 which is provided with suitable code signaling apparatus such as the horn or lights illlustrated at 88 and 90 respectively. The selected code signaling apparatus is located at strategic points throughout the industrial plant or institution.

With the double throw double pole switch 50 in this position the selected code will continue to sound until it is acknowledged whereupon the operator moves pole 52 into the off position in slot 54. This breaks the circuit to terminal 78 and signaling is stopped.

Signaling may be stopped regardless of the position of contact 34 on the code wheel without scrambling the codes. This is achieved by means of the cam switch 92 which continues to feed electric current to motor 20 even though the circuit for starting the motor through switch 50 is open. Current from terminal block 59 is fed to one of the spring contacts 94 of switch 92 by means of wire 96. Spring contact 94 bears against the periphery of a cam wheel 98 which as best shown in FIG. 1 is rotatively mounted on support 16 and caused to rotate with shaft 14 by means of the gear 100 which is mounted on the shaft.

In the preferred form of structure shown the gear ratio is such that shaft 14 and code wheels 10 and 12 will make four complete revolutions for each revolution of cam wheel 98. The periphery of cam wheel 98 is provided with four notches 101 and each of the notches are arranged so that contact 94 of switch 92 will be in one of the notches when either of the spring contacts 32 or 34 are positioned on a box 26 of the index line which marks the start of the different code sequences. When spring contact 94 is in a notch cam switch 99 is open and no current is fed to motor 20 but when spring contact 94 slides on the periphery of code wheel 98 spring contact 94 is closed against spring contact 102 and as a result current is fed through wire 74 to motor 20 (FIG. 5).

If the double throw double pole switch is placed in the off position upon acknowledgment when contact 34 is in the middle of a code sequence, motor 20 will continue to run and rotate the code wheels until contact 34 reaches the proximity of the index line of boxes 26 whereupon spring contact 94 will enter one of the four notches 101 to open switch 92 and stop the motor. In this connection it will be understood that opening and closing of switch 92 has no effect on motor operation while switch 50 is in the closed position in a notch of slot 54 since electric current will then be fed to motor 20 through switch 50 as previously described. When motor 20 is fed electric current through switch 92 there will be no code signaling when switch 50 is in the "off" position in slot 54 even though the motor will continue to run until contact 34 reaches the index line on the code wheel.

After the first code signal is acknowledged it is conceivable that the operator may desire to start signaling before contact 34 returns to the index line. If this were done the code sequence could be scrambled. This is prevented by means of a lamp 104 which is "on" whenever the motor is operating. Lamp 104 is mounted on the front plate 56 (FIG. 3) where the operator can see it and as shown in FIG. 5 when switch 50 is in the "on" position or when the contacts of switch 92 are closed electric current is fed to the lamp by means of conduit 70 and wire 106. The circuit through the lamp is completed by the conduit 108. As a result lamp 104 will be on at all times when motor 20 is operating and the operator must wait until the lamp is off before starting a new code signal after acknowledgment.

Figure 2:
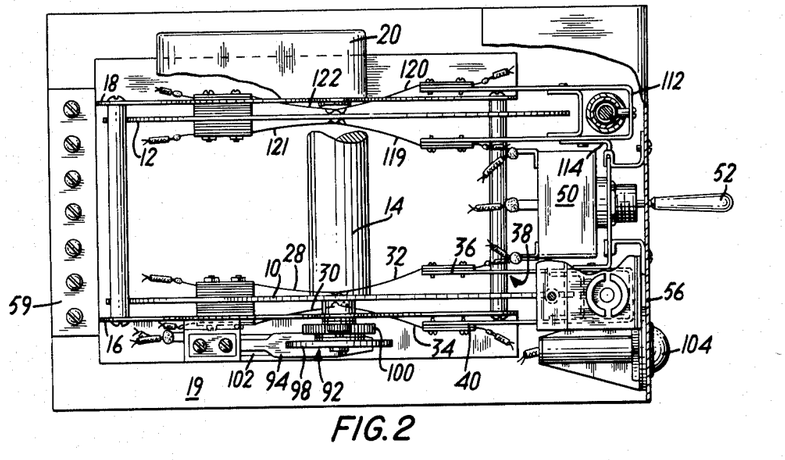
FIG. 2 is a top view of the device of FIG. 1.
Figure 3:
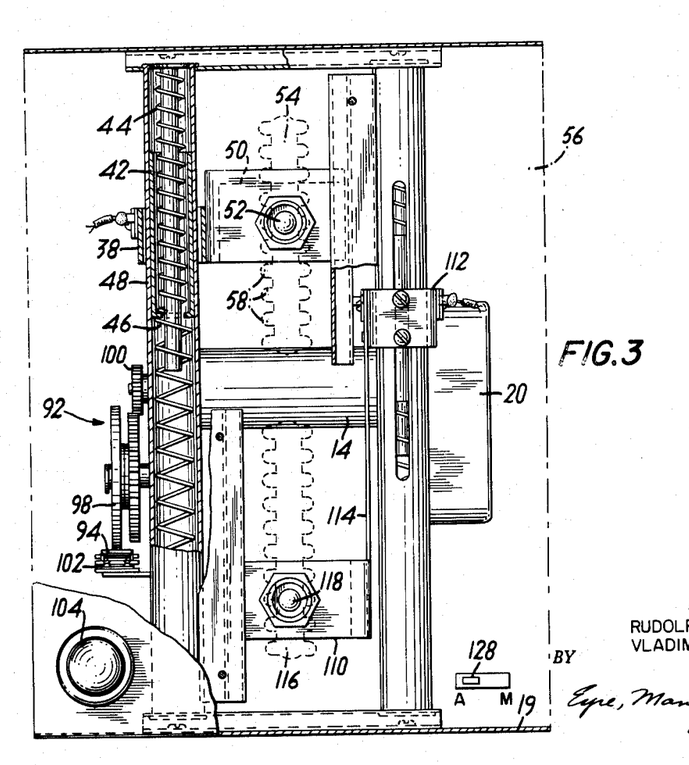
FIG. 3 is a front view of the device of FIG. 1 cut away in part to better illustrate construction.

The contacts and electrical controls employed for operating code wheel 12 are identical to those described for code wheel 10. As best shown in FIGS. 2 and 3 a double throw double pole control switch 110 is mounted on a yoke 112 exactly as described for switch 50, with the exception that switch 110 is mounted on the yoke by means of a bracket 114 so that slot 116, switch 110 and the operating pole 118 of switch 110 may be located in operable position below switch 50. The two spring contacts of yoke 112 are held in approximately the same position against wheel 12 as that occupied by the two spring contacts of yoke 36. As a result of having the contacts of both yokes on the same side of a horizontal plane through the center of the shaft of the code wheels each wheel will make sliding contact in similar manner with the spring contacts and preferably the wheel is rotated to move away from the free ends of the contacts for best results. The location of switch 110 below switch 50 is done for convenience of construction and it will be understood that the switches 50 and 110 may be positioned at the same level next to each other. The conduits connected to switches 50 and 110 are, of course, provided with the necessary slack so that the switches can move up and down along the length of the respective slots. The wiring for switch 110 and spring contacts 119 and 120 and 121 and 122 for supplying electric current to the printed circuits of code wheel 12 is identical to that of code wheel 10 and these wires are connected in known manner into the circuit described for code wheel 10 in order to operate motor 20, cam switch 92 and lamp 104 in the manner previously described hereinabove.

It will be understood by those skilled in the art that only one or if desired two or more code wheels may be mounted on shaft 14 and only one or both sides of the code wheels may have printed circuits thereon. Any number of different code sequences may be printed on the code wheels depending upon the size of the wheel. If desired the code wheels may be made of electrical conducting metal and the code sequences may be printed on by applying insulating material to the face of the wheel in known manner. The code wheel may be mounted in vertical or horizontal position depending upon the configuration of the exterior casing. If desired cam wheel 98 may be mounted directly on shaft 14 and in such case the code wheel would have only a single notch corresponding to the index line on the code wheel.

In the second embodiment of the invention automatic controls are provided so that the device may be set to repeat a code signal for a predetermined period of time and automatically stop signaling at the end of such period. In such case the mechanical structure illustrated in FIG. 1 is operated by the circuit shown in FIG. 6 in place of the circuit of FIG. 5.

Figure 6:
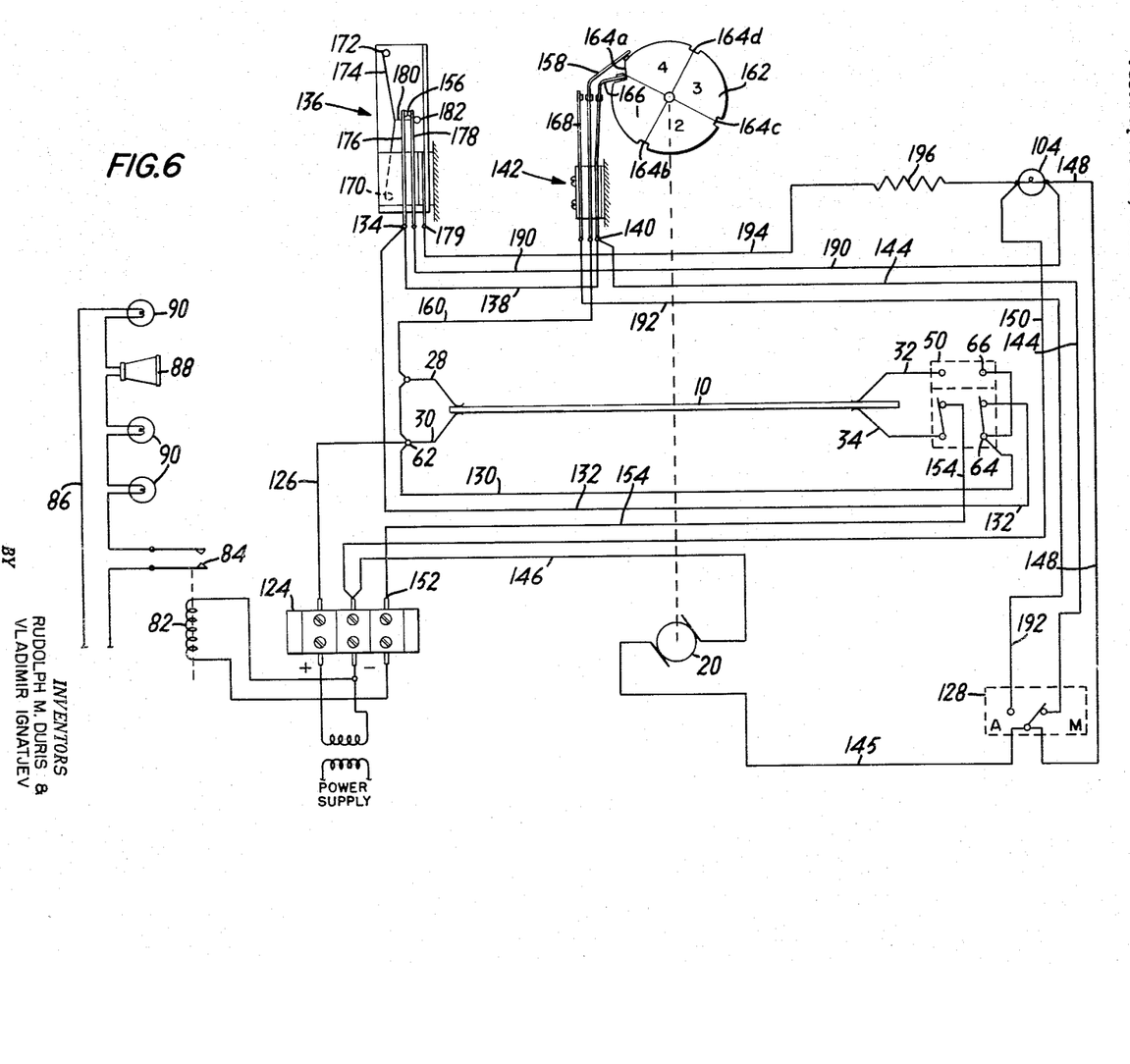

Assume as before that pole 52 or switch 50 is moved into a notch on the left hand side of slot 54, electric current would then be fed from terminal block 124 through 126 to terminal 62 of spring contact 30 which in turn feeds current into printed circuit of code wheel 10.

In this embodiment a two position switch 128 appears on the front plate 56 (FIG. 3) of the unit having one position marked M for manual operation and a second position is marked A for automatic. When switch 128 is one the manual setting (FIG. 6) current for starting motor 20 flows through conduit 130 to switch 50 and then through conduit 132 to terminal 134 of a hot wire relay 136 (later described). Current then flows from terminal 134 through conduit 138 to terminal 140 of cam switch 142 (later described) and then through conduit 144 to switch 128. When the switch is on manual the electric current will flow through conduit 145, motor 20 and then through conduit 146 to complete the circuit.

Current to lamp 104 flows from switch 128 through conduit 148 and the circuit through the lamp is completed by means of conduit 150. As previously described lamp 104 is "on" at all times while motor 20 is in operation. It will be noted that lamp 104 is connected in parallel with motor 20.

The motor is now running and when spring contact 34 slides across the metallic portions of the printed circuit electric current will be fed through switch 50 to terminal 152 of the terminal block 124 by means of conduit 154.

Terminal 152 of the terminal block 124 feeds current to the relay 82 which causes the code signal to be broadcast through the plant or institution as previously described.

Electric current supplied to motor 20 also flows through the hot wire relay 136 (later described) and this causes the contacts at 156 to open but examination of the circuit shows that these contacts do not effect operation of motor 20 when switch 128 is set for manual operation.

With switch 50 set in the desired position, code signaling will continue until it is acknowledged and the operator moves pole 52 into the "off" position in slot 54. This breaks the circuit to terminal 152 to stop the signals and at the same time it stops the flow of current to terminal 134. Motor 20 will continue to run however, and the current for running the motor is supplied by cam switch 142.

Current is supplied to one of the spring contacts 158 of cam switch 142 by conduit 160 which is directly connected to the positive side of terminal block 124 by conduit 126. Spring contact 158 bears against the periphery of a cam wheel 162 which is rotatively mounted on support 16 in place of cam wheel 98. Cam wheel 162 has four notches 164a, b, c and d each of which is arranged in the wheel in position to correspond to the index line on the code wheels as previously described for the notches of cam wheel 98. Cam wheel 162 is driven by gear 100 and the wheel 162 will rotate once for each four revolutions of the code wheels.

A second spring contact 166 of cam switch 142 also rides on the periphery of cam wheel 162 and a third spring contact 168 is held in fixed position adjacent one side of spring contact 158. One notch 164a of cam 162 is deeper than the other three notches and size and depth of notch 164a is such that both of the spring contacts 158 and 166 will enter the notch. As a result the three spring contacts are all open when contacts 158 and 166 are in notch 164a.

When the motor is started up spring contact 166 will leave notch 164a and slide along the periphery of cam 162. As a result spring contact 166 closes against spring contact 158 and forces it over to the left to bear against spring contact 168 which is also flexed over to the left (FIG. 6). If the operator moves the pole of switch 50 into the "off" position after a code is acknowledged and if spring contact 166 is riding on the periphery of cam 162 at such time, signaling will stop but motor 20 will continue to run since electric current is now supplied to switch 128 by spring contact 166 through conduit 144. Lamp 104 will remain on as long as the motor runs.

The motor will continue to run until spring contact 166 drops down into one of the notches 164a, b, c, or d. When this occurs contact 166 moves away from contact 158 to open these two contacts and motor 20 will stop with the contacts 32 and 34 in position on the index line of the code wheel. It will now be understood that the circuit of FIG. 6 provides the same type of manual operation previously described for the circuit of FIG. 5.

In addition the circuit of FIG. 6 provides automatic operation. Assume that switch 128 is now set for automatic operation as shown in the drawings and the operator moves pole 52 of switch 50 into a notch on the left hand side of slot 54. Electric current for generating code signals will be supplied as described for manual operation. Current for starting up motor 20 will be supplied to terminal 134 as described for manual operation but the current cannot flow from conduit 144 to motor 20 as previously described since switch 128 is now set for automatic operation. Current for starting up motor 30 is supplied by the hot wire relay 136.

Figure 4:
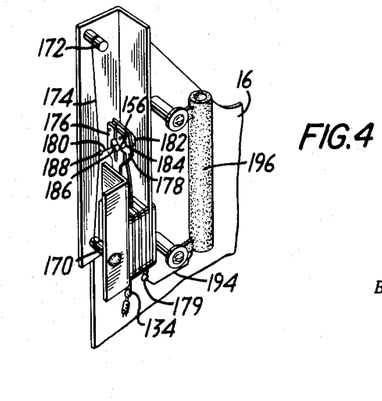
FIG. 4 is an enlarged view of a preferred form of hot wire relay of the device of FIG. 1.

The novel hot wire relay 136 is best shown in FIGS. 4 and 6. As there shown the relay includes two fixed support members 170 and 172 which carry an electrically conductive wire 174 attached in fixed position at each end to one of the fixed support members. The relay has two spring contact switch members 176 and 178 which are normally closed. The spring contact switch members are held closed against the tension of the spring of the contacts by means of a link 180. Link 180 does not conduct electric current to the spring contact members and it may be made of suitable insulating material or as shown in the drawings the link may be made of metal wire provided with a ball of electric insulating material 182. The spring contact switch member 178 is provided with a hole 184 (FIG. 4) the inside diameter of which is less than the outside diameter of the insulation ball 182 and greater than the diameter of the wire link. Spring contact member 176 is also provided with a hole 186 of greater inside diameter than the outside diameter of the wire link. The contact members are separated by electrical insulation and assembled in the relay with the two holes aligned. Link 180 is inserted through the holes with the insulated ball bearing against contact 178 and the hooked end 188 of the link is hung on wire 174 as shown in the drawings. Link 180 is a separate piece and it may move relative to the wire and pivot on the ball relative to both of the spring contact members. As a result the hook 188 will seek the mid point of the wire 174 and transmit maximum wire movement to spring contact 178. Since link 180 is capable of independent movement relative to wire 174 and relative to both spring contact members it is adapted to withstand vibration without impairing operation. Spring contact 176 is electrically connected to fixed support 170 as by the metallic portion of the frame so that current from terminal 134 will flow through support 170, wire 174 fixed support 172 to terminal 179. In operation electric current is fed through wire 174 and the heat generated by the current causes the wire to elongate so that spring contact 178 will move to the right (FIG. 6) and open the contacts at 156. When the supply of electric current to the hot wire 174 is interrupted the wire tightens between the supports and closes the spring contacts 176 and 178.

Referring now to automatic operation of the signaling device electric current is supplied to terminal 134 and since the contacts 156 of the spring contact switch members 176 and 178 are closed the current will flow across the contacts through conduit 190 to one side of lamp 104. Since lamp 104 is connected in parallel with motor 20 the current flows through the lamp and through conduit 150 to light the lamp and the current also flows through conduit 148 and conduit 145 to start motor 20. Relay 136 is a time delay relay and it takes about six seconds for the wire to heat up and elongate to the point where the contacts at 156 will open and by the time the contacts at 156 open cam switch 142 will be supplying current to motor 20.

Assuming that the spring contacts 158 and 166 are in notch 164a of cam wheel 162 when the operator started automatic operation, cam 162 will start to rotate when motor 20 starts and by the time contacts 156 are opened both of the spring contacts 158 and 166 will have moved up out of notch 164a to slide along the periphery of the cam. As previously described this results in closing all three of the spring contacts 158, 166 and 168 and current for running motor 20 will now be supplied from spring contact 168 to motor 20 by means of the conduit 192, switch 128 and conduit 145. Current to light lamp 104 is now supplied by switch 128 and conduit 148.

Motor 20 will continue to run as long as spring contact 158 is closed against spring contact 168. At the end of one revolution of the code wheels spring contact 166 will drop down into the first notch 164b and open the contacts 166 and 158. But motor 20 will continue to run since spring contacts 158 and 168 still remain closed. When contact 166 is in notch 164b spring contact 158 will still bear against the periphery of the cam 162 to hold contacts 158 and 168 closed and when spring contact 158 is in position to drop down into notch 164 it cannot do so because spring contact 166 will have moved out of the notch to bear against the periphery of cam 162. At this time spring contact 166 will also bear against spring contact 158 and prevent it from entering notch 164b and the contacts of the cam switch operate in the same manner for notches 164c and d. As a result cam 162 will make one complete revolution until spring contact 158 and 166 both enter the large notch 146a which causes all three contacts to open. This will stop motor 20 and lamp 104 will be off. As previously described code wheels 10 and 12 will have completed four full revolutions for one revolution of the cam wheel 162 and when the motor stops contacts 32 and 34 will be positioned on the index line of the code wheels in a box 26 which marks the start of the different code sequences.

When contacts 158 and 168 open motor 20 will not start up again since contacts 156 are still open. The current supplied to terminal 134 passes through fixed support 170, the hot wire 174 and fixed support 172 to terminal 179. The current flows from terminal 179 through conduit 194, resistance 196 and conduit 150 to terminal block 124. As a result wire 174 remains hot and contacts 156 remain open.

Assume that switch 50 is left in the "on" position at the end of automatic operation and the operator now desires to start a new code sequence on an automatic code cycle. In order to do this switch 50 must be moved into off position in order to cut off the current supply to the hot wire relay. The wire will quickly cool and when cool, it will have contracted to close the contacts at 156. This only takes about one half a second and then the operator can move switch 50 into the "on" position and start another automatic cycle. In the structure shown the hot wire 174 of relay 136 is a Nichrome wire.

The desired automatic cycle will run for four complete revolutions of the code wheel 10. But any desired number of revolutions may be employed by changing the ratio of gear 100 or by changing the position and number of the large notches 174a employed in the periphery of cam 162. It will also be understood that automatic operation may be started after manual operation when spring contact 166 is positioned in one of the notches 164b, c or d. In such case the automatic cycle will provide whatever number of revolutions of the code wheel that may be required to position the spring contacts 158 and 166 in notch 164a Assume that the automatic code signal is acknowledged before contacts 158 and 166 enter notch 164a. In such case switch 50 is moved into the neutral "off" position but as in the case of manual operation this will not scramble the code sequence since the motor will continue to run without code signaling until contacts 158 and 168 enter notch 164a. Lamp 104 remains on until motor 20 stops. The contacts 156 of the hot wire relay will have closed by the time contacts 158 and 166 enter notch 164a but motor 20 will not start because no current will be supplied to terminal 134 while switch 50 is in the neutral "off" position.

Versatility of application of the hot wire relay 136 will be readily apparent to those experienced in the art particularly where it is desirable to provide time delay in opening contacts 156 followed by a relatively long open period and short closing time. While the time delay relay is particularly adapted for use in the present device description in connection therewith is not intended to limit the scope of utility of the relay which has wide application beyond that of the signaling device described herein.

A preferred form of circuit and rotating support member for the printed circuit is illustrated in FIGS. 9 through 12. The rotating support member 200 illustrated in the drawings has ten different code signals positioned on each side giving a total of twenty calls and one or more of these supports may be mounted in the device of FIG. 1 as described hereinabove for the supports 10 and 12. An index line of boxes 202 approximates the starting point of each of the different code signals and the boxes 202 on opposite sides of the support are aligned with each other, and with the notches in opposite sides of the slot in the plate 56. An electric connector 204 is soldered or otherwise electrically connected to the inner circles 206 and 208 of the printed circuits on opposite sides of the support, to establish electrical connection between both of the printed circuits.

Figure 9:
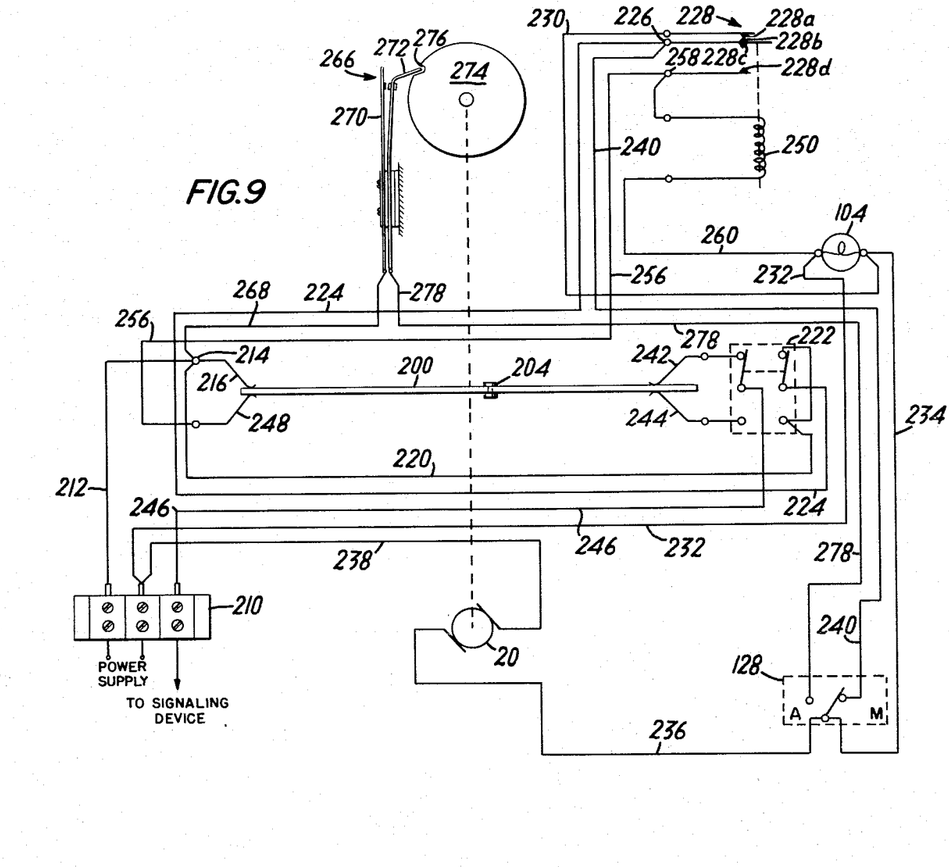
FIG. 9 is a schematic of the circuitry of the preferred form of the invention.

Referring now to FIG. 9 the current from terminal block 210 flows through conductor 212 to the terminal 214 and then through the spring contact 216 which is held in position against the outer continuous circle 218 (FIG. 12) of the printed circuit on one side of the support and the current from this printed circuit flows through connector 204 to the printed circuit on the second side of the support. Electric current is also fed from terminal 214 through line 220 to the double pole double throw switch 222 which when moved into any one of the notches 58 of plate 56 (FIG. 1) will supply the current for starting motor 20 through line 224 to the terminal 226.

When switch 128 (FIG. 3) is set for automatic operation the current from terminal 226 flows across the normally closed contacts 228 through line 230 to the lamp 104. Since the lamp is connected in parallel with motor 20 the current will light the lamp and also start motor 20. This current flows through the lamp and then through line 232 to terminal block 210 to complete the circuit through the lamp and the current also flows through line 234, 236, motor 20, and line 238 to terminal block 210 to complete the circuit for the motor which thereupon starts up for automatic operation.

When switch 128 is set for manual operation current fed to terminal 226 flows through line 240, switch 128, line 236, motor 20 and line 238 to complete the circuit and start the motor. In this case the current for lighting lamp 104 flows from switch 128 through line 234, lamp 104 and line 232 to complete the circuit.

As previously described hereinabove before for the structure of FIG. 1 the double throw double pole switch 222 has a pair of spring contacts 242 and 244, each of which bear against opposite sides of the support 200. The spring contacts 242 and 244 are each positioned against opposite sides of the support in the area of the index line of the boxes 202 as previously described hereinabove in connection with supports 10 and 12. Since the double throw double pole switch 222 has been moved into a notch 58 on the left hand side of plate 56 (FIG. 1) spring contact 242 which bears against the surface of the support will feed electric current to switch 222 each time the spring contact 242 passes over a segment of the printed circuit on the surface of the support. The current for signaling flows from switch 222 through line 246 to terminal block 210 which as previously described hereinabove (FIG. 5) provides the current for generating audible code signals. As illustrated, for each revolution of the support the designated code signal will sound twice. However, the number of signals for a revolution of the wheel is not critical and may be varied by changing the printed circuit.

When the switch 128 is set for manual operation signaling will continue until the double throw double pole switch 222 is opened. If the double pole double throw switch is opened at the time when spring contact 242 is not in position in the area of the index line of boxes 202 the code will not be scrambled because motor 20 will continue to run until the spring contact is positioned in the area of the index line of boxes 202. This is achieved by means of spring contact 248 and the relay lock 250.

Figure 10:
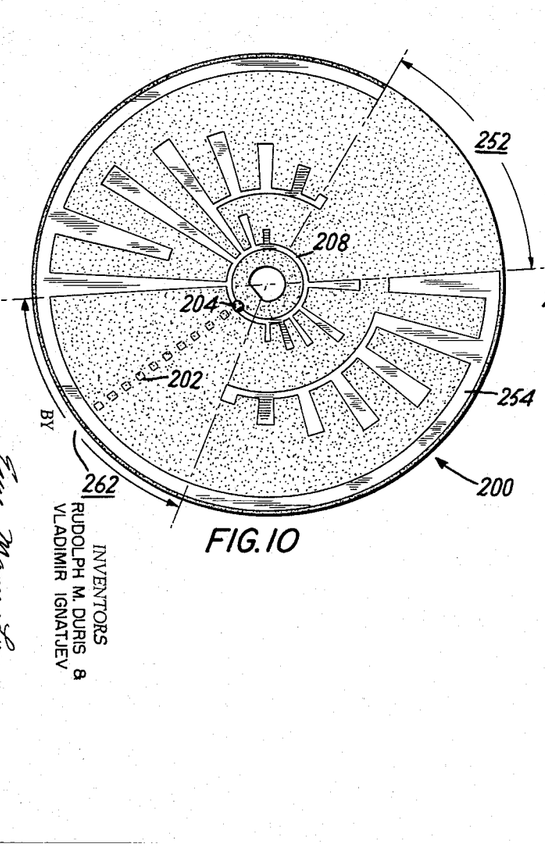
FIGS. 10 thru 12 illustrate the way in which the printed circuits may be arranged on the disc of the preferred form of the invention.
Figure 11:
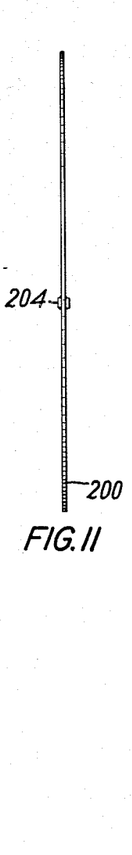
Figure 12:
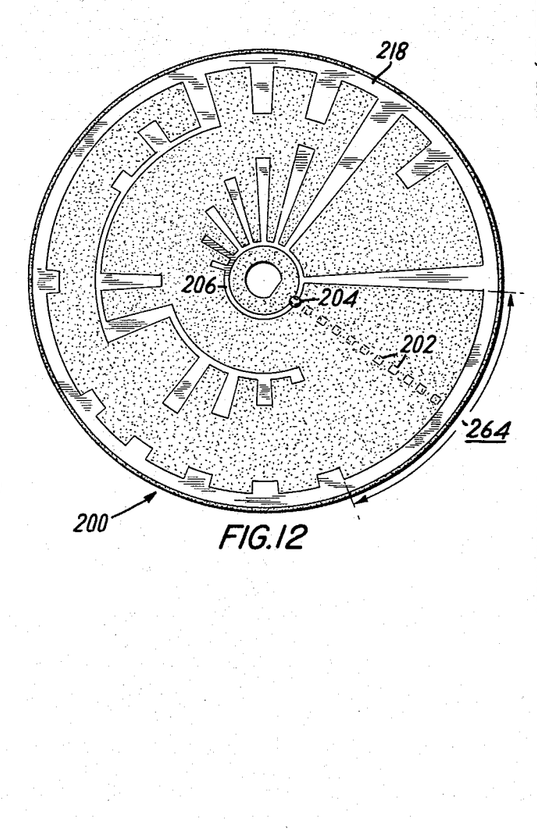

Spring contact 248 bears against the face adjacent the periphery of the side of the support shown in FIG. 10 and at the time that motor 20 is started up the spring contact is positioned against the face of the support in the gap at 252. Spring contact 248 does not receive current until it contacts the outer circle 254 of the printed circuit. When this occurs current is fed through line 256 to terminal 258 and then through relay 250, line 260 and line 232 to complete the circuit. When the relay 250 is actuated it opens the spring contacts 228a and b and closes spring contacts 228c and d. It will be noted that the opening of spring contacts 228a and b does not effect operation of the motor when switch 128 is on manual since current is continuously supplied through line 240 as long as the double pole double throw switch 222 remains closed. However, if the double pole double throw switch 222 is opened current for running motor 20 is supplied from terminal 258 through the closed contacts 228c and d, line 240 and switch 128 to motor 20 which continues to run. At the same time current flows through line 234 and through lamp 104 which remains on. The motor will continue to run until the spring contact 248 again reaches the gap 252 in the printed circuit whereupon the current is cut off and the motor ceases to operate. When the motor stops the code signaling contacts 242 and 244 are positioned within the segment of the support marked 262 in FIG. 10 in the case of contact 244 and 264 in the case of contact 242. Since no code signaling is provided for in the gap 262 and 264 there is no chance of scrambling the code. In this connection it will be noted that the gaps 252, 262 and 264 in the printed circuit each cover a sector of about fifty degrees to accommodate drift when the supply of current to motor 20 is cut off.

During automatic operation when the spring contact 248 is receiving current from the circular element 254 the relay lock 250 is actuated to open contacts 228a and b and to close the contacts 228c and d as previously described for manual operation. Opening of the contacts 228a and b does not interrupt the supply of current to motor 20, which is now supplied by the cam switch 266 (FIG. 9). Current is supplied from terminal 214 through line 268 to one of the spring contacts 270 of switch 266. The cooperating spring contact 272 bears against the periphery of the cam wheel 274, which as in the case of cam wheel 98 is caused to rotate by means of the gear 100 so that the cam wheel 274 will make one complete revolution for each four revolutions of the support 200. At the time support 200 starts to rotate during automatic operation the spring contact 272 is positioned in the notch 276 of the cam wheel, and as the cam starts to rotate spring contact 272 rides up out of the notch 276 to close the contacts of cam switch 266. As a result, current from the cam switch 266 is supplied to motor 20 by line 278, switch 128 and line 236 to motor 20. Current from switch 128 is supplied through line 234 to light the lamp 104.

Assuming now that the double pole double throw switch 222 remains "on," signaling will continue until spring contact 272 again rides down into the notch 276, to open contacts 270 and 272 and interrupt the supply of current to motor 20 which will automatically stop signaling after four complete revolutions of support 200. In this connection it will be understood that the notch 276 is so positioned in cam wheel 274 that when the contacts of switch 266 are open spring contacts 242 and 244 will be positioned in the gaps in the printed circuit 264 and 262 respectively and spring contact 248 will be positioned in the gap 252. When contact 248 enters gap 252 spring contacts 228c and d remain closed because current is still being supplied to the relay lock 250 by the switch 222 and line 224. As a result the relay lock prevents the start of a second code signaling cycle. The relay lock 250 also prevents scrambling in a device utilizing two or more supports 200. In such case the closing of the switch 222 to start motor 20 for a signaling sequence on the second support would be ineffective for starting motor 20 while lock-out relay 250 is actuated by switch 222 which is closed to hold contacts 228a and b open. Before a second code signaling cycle may be started it is necessary to move the double pole throw switch 222 into the "off" position which deactuates the relay 250 and allows the spring contacts 228a and b to close. If the switch 222 is moved into the "off" position during automatic code signaling motor 20 will automatically stop when the spring contact 272 rides down into the notch 276. In such case lamp 104, which remains "on" during the entire signaling cycle, cautions the operator not to start another signal sequence until lamp 104 is "off."

Figure 13:
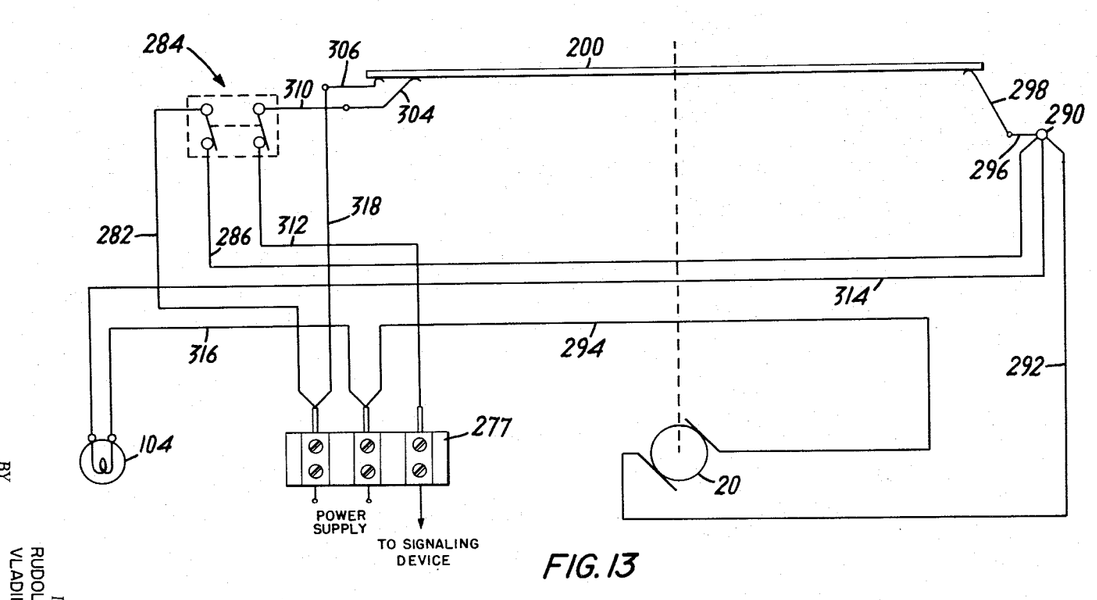
FIG. 13 is a schematic diagram of a simplified form of the preferred form of the invention.

A schematic for a simplified form of the device using the printed circuit of FIG. 10 is shown in FIG. 13. As shown the support 200 is provided with a printed circuit on one side 278 of the support. The printed circuit has ten different code signaling sequences and each of the different code sequences will sound twice for each revolution of the support. The support 200 and its circuit may be mounted in a framework such as that described previously.

Current for starting up motor 20 is supplied by line 282 to the double pole single throw switch 284. In this case only a single throw switch is necessary since all of the code sequences are positioned on one side of the support. The current flows from switch 284 through line 286 to the terminal 290. From there current is supplied to the motor 20 by line 292 and the circuit is completed by line 294. Current to the printed circuit is supplied by line 296 and the spring contact 298 which bears against the interrupted circular element 254 of FIG. 10. When motor 20 starts up the contact 298 is positioned against the support in the gap 252. At this time the spring contact 304 is positioned in the gap 262 in line with one of the boxes 202 which designates one of the ten different code signaling sequences. Spring contact 306 is positioned against the printed circuit element 254 diametrically across the support from the contact 298.

As the support rotates spring contact 298 contacts circular element 254 to supply current to the printed circuit and when contact 304 passes over the elements of the printed circuit current is supplied through line 310, switch 284, line 312 to the terminal block 277, to actuate the audible signals (not shown). Current for lamp 104 is supplied from terminal 290 by line 314 and the circuit through the lamp is completed by the line 316. As long as switch 284 remains "on" code signaling will continue and it will not be interrupted when the spring contact 298 rides through the gap 252 since current will still be supplied to motor 20 by switch 284; and lines 286 and 292. Assuming now that the code signal has been answered and the operator opens switch 284 in such case this interrupts the code signaling but the support 200 will continue to rotate because current for motor 20 will now be supplied by spring contact 306 which is in contact with circular element 254. Current flows from terminal block 277 through line 318 to spring contact 306 through the circular element 254 to spring contact 298. Current from spring contact 298 flows through lines 296 and 292 to motor 20 which continues to run. Motor 20 continues to run until either one of the spring contacts 306 or 298 passes into the gap 252 of the printed circuit element 254. Since the printed circuit is so arranged that none of the elements for code signaling are positioned in the gap of sector 252 or in the gap of sector 262 there can be no scrambling of the code signals regardless of whether the contact 306 or 298 enters the gap 252 to stop motor 20.

It will be understood that it is intended to cover all changes and modifications of the preferred form of structure herein chosen for the purpose of illustration which do not constitute a departure from the spirit and scope of the invention.

What we claim is:

1. Signaling apparatus comprising at least one signal wheel having an circuit on at least one surface thereof adapted to provide a plurality of different code sequences, an index line arranged along a radius of said signal wheel to mark the start of the different code sequences, an electric motor for rotating the signal wheel, first electric circuit means for feeding electric current to the circuit on the signal wheel for generating code signals and for feeding current to said motor for rotating the signal wheel, said first electric circuit means having a first switch therein for controlling the flow of electric current, second electric circuit means for feeding electric current to said motor for rotating the signal wheel independently of said first electric circuit means, said second electric circuit means having a cam switch therein for controlling the flow of electric current to said motor, means for rotating said cam switch when the signal wheel is caused to rotate, said cam switch being adapted to feed electric current to said motor when said first switch is open to cause the motor to continue to rotate the signal wheel until the said index line reaches a predetermined position and to discontinue the supply of electric current to said motor when the index line reaches the said predetermined position.

2. Signaling apparatus comprising at least one code wheel having a printed circuit on at least one surface thereof adapted to provide a plurality of different code sequences, an index line arranged radially on said surface to mark the start of the different code sequences, an electric motor for rotating the code wheel, electric circuit means for feeding electric current to said printed circuit for generating code signals and for feeding electric current to said motor for rotating the code wheel, said electric circuit means having a switch and a hot wire relay switch therein said hot wire relay being normally held in closed position for feeding electric current to start said motor and said hot wire switch being adapted thereafter to open and remain open while said motor continues to run, cooperating electric circuit means for feeding electric current to said motor for rotating the code wheel when the current supplied by said electric circuit means is interrupted, said cooperating circuit means having a cam switch therein for controlling the flow of electric current to said motor, said cam switch being adapted to feed electric current to said motor when said hot wire relay is open to cause the motor to continue to run when the current supplied by said electric circuit means is interrupted until the said index line reaches a predetermined position and to discontinue the supply of electric current to said motor when the index line reaches said position.

3. Signaling apparatus comprising an electrically actuated signaling means, a rotating member means for providing to the electrically actuated signaling means an actuating signaling sequence of electric pulses which is selected from a plurality of signaling sequences that can be provided by said rotating member means while said rotating member means is rotating, a first electric circuit means for controlling the signaling, said first electric circuit including a switch means which is movable to select the desired sequence from the plurality of sequences which can be provided and which can be switched into a first operating state to simultaneously supply through the first electric circuit means the signaling pulses to the electrically actuated signaling means and electric excitation to the electric motor and which can be switched into a second operating state to cut off the supply of signaling pulses to the electrically actuated signaling means and electric excitation to the motor through the first electric circuit means, and a second electric circuit means reponsive to the orientation of said rotating member means for supplying electric excitation to the motor while said rotating member means is out of a starting position to prevent scrambling of signal sequences if said switch means is switched from its first operating state into its second operating state in the middle of a signaling sequence.

4. The signaling apparatus of claim 3 including a signaling means to indicate whether or not said electric motor is running so that a second selected signaling sequence will not be initiated while the rotating member means is not in a starting position.

5. The signaling apparatus of claim 3 including circuit means for automatically ending the supply of electric pulses to the electrically actuated signaling means after a predetermined number of cycles of the signaling sequence.

References Cited by the Examiner

UNITED STATES PATENTS

| | | | |
|---|---|---|---|
| 936,835 | 10/09 | Van Horn | 340—357 |
| 1,144,870 | 6/15 | Sohm | 340—357 |
| 2,896,163 | 7/59 | Baker | 324—106 |
| 3,025,373 | 3/62 | Bullis | 200—113.1 |
| 3,074,059 | 1/63 | Flavan | 340—347 |
| 3,097,279 | 7/63 | Whinery | 200—113.1 |

NEIL C. READ, *Primary Examiner.*